Patented Oct. 28, 1947

2,429,691

UNITED STATES PATENT OFFICE 2,429,691

META-DI-TERT-BUTYLBENZENE

Carl E. Johnson, St. Louis, Mich., and Chester E. Adams, Highland, Ind., assignors to Standard Oil Company, Chicago, Ill., a corporation of Indiana No Drawing. Application May 27, 1947, Serial No. 750,884

6 Claims. (Cl. 260—671)

This invention relates to a new composition of matter consisting essentially of m-di-tert-butylbenzene and also to a process for the production thereof.

Although p-di-tert-butylbenzene has long been known (Beilstein, Handbuch der Org. Chemie, 4th edition, vol. 5, page 454; supplement, V, page 216), the m-isomer has, to our knowledge, never before been prepared and isolated. We have succeeded in preparing and isolating substantially pure m-di-tert-butylbenzene, have prepared certain derivatives thereof and have otherwise studied its properties as will be pointed out in more detail hereinafter.

One object of our invention is to provide a process for the preparation of m-di-tert-butylbenzene. Another object of our invention is to provide the art with a new hydrocarbon, namely, m-di-tert-butylbenzene. These and other objects will become apparent from the ensuing description of our invention.

The alkylation of benzene with isobutylene in the presence of aluminum chloride or other Friedel-Crafts catalysts at normal or moderate temperatures appears to yield the p-di-tert-butylbenzene exclusively (W. M. Potts and L. L. Carpenter, J. Am. Chem. Soc. 61, 663-4 (1939)). We have found, however, that m-di-tert-butylbenzene can be produced by the dialkylation of benzene with isobutylene in the presence of aluminum chloride at relatively high temperatures, for example temperatures between about 130° F. and about 220° F. The m-di-tert-butylbenzene which is produced by the alkylation reaction can be separated from the isomeric p-di-tert-butylbenzene, which appears to be the only other isomer in the reaction mixture, by fractional distillation.

We have prepared m-di-tert-butylbenzene by passing 230 grams of isobutylene into a rapidly stirred mixture of 225 grams of benzene (previously saturated at room temperature with dry HCl) and 15 g. of anhydrous aluminum chloride over a period of 3 hours, the reaction temperature being maintained between about 130° F. and 140° F. The hydrocarbon products were fractionally distilled under reduced pressure to obtain m-di-tert-butylbenzene, which boils at approximately 78.5° C. (uncorr.) at 4.4 mm. of mercury pressure. The following product distribution was obtained from the fractional distillation operation:

| Compound | Vol. Per cent of Total Product |
|---|---|
| benzene | 4 |
| mono-tert-butylbenzene | 18 |
| m-di-tert-butylbenzene | 16 |
| p-di-tert-butylbenzene | 22 |
| higher boiling products | 39 |

A comparison of some of the physical properties of p- and m-di-tert-butylbenzenes is given in the following table:

|  | para- | meta- |
|---|---|---|
| M. P. (°C.) | 76.5-77.5 | 10.6 |
| B. P. at 18.2 mm. (°C.) | 117.3 | 106.5 |
| B. P. at 4.4 mm. (°C.) | 88.6 | 78.5 |
| $n_D^{20}$ | [1] (1.4624) | 1.4870 |

[1] G. Egloff "Physical Constants of Hydrocarbons, vol. III, page 159 (1946).

The molecular weight of m-di-tert-butylbenzene produced by the above process was 197 by the Menzies method; the theoretical value is 190. M-di-tert-butylbenzene absorbed ultraviolet light in a range lower than that of the para isomer.

We may employ other methods than the one described above for the preparation of m-di-tert-butylbenzene. Thus aluminum chloride may be replaced by other catalysts of the Friedel-Crafts type. Also, we may effect the isomerization of p-di-tert-butylbenzene to the meta-isomer. p-di-tert-butylbenzene may be contacted with about 1 to 10 weight per cent of aluminum chloride promoted with a small amount of hydrogen chloride at a temperature sufficiently high to effect isomerization, e. g. temperatures between about 130° F. and about 220° F. or even higher for a period of time sufficient to effect the desired amount of isomerization.

We have also discovered a surprising property of the m-di-tert-butylbenzene which is not possessed by the p-isomer, viz., that exo-halogenated derivatives of the m-isomer are stable in the presence of concentrated sulfuric acid and can, therefore, be sulfonated, whereas the exo-halogenated derivatives of the p-isomer are unstable in the presence of sulfuric acid. The sulfonatability of the exo-halogenated m-di-tert-butylbenzene is of significance since the sodium salts of such sulfonates have foaming and wetting power and for the further reason that the sulfonic acids derived from exo-halogenated m-di-tert-butylbenzene are convertible to other derivatives such as phenols, amines, etc.

In order to compare the halogenated m-di-tert-butylbenzenes with halogenated p-di-tert-butylbenzene, we have prepared beta-tetrachloro derivatives from m- and p-di-tert-butylbenzene, respectively. We have found that the m-tetrachloro-di-tert-butylbenzenes can be sulfonated and neutralized with caustic to yield a water-soluble sodium sulfonate derivative having foaming and wetting properties. However, attempted sulfonation of p-tetrachloro-di-tert-butylbenzenes resulted in extensive decomposition, as evidenced by the generation of HCl, and no sulfonic acid for sulfonate could be isolated; other exo-halogenated p-di-tert-butylbenzenes react similarly.

The following procedure was used in the chlorination of m-di-tert-butylbenzene. A solution was prepared of 23 g. of m-di-tert-butylbenzene and 150 cc. (204 g.) of carbon tetrachloride, to which were added 65.6 g. of sulfuryl chloride and 1 g. of benzoyl peroxide. The resulting mixture was refluxed for 18 hours. The reaction product was washed with aqueous sodium hydroxide and dried by filtering through paper. Carbon tetrachloride was then stripped from the essentially water-free solution with nitrogen on a steam bath for 8 hours; a pale yellow viscous oil remained as a residue from the stripping operation. The weight of the residual chlorinated m-di-tert-butylbenzene as 37.9 gs. (96% of the theoretical yield) and its molecular weight as determined by the Menzies method using benzene as the solvent was 320. The molecular weight value obtained compares well with that for a tetrachloro-m-di-tert-butylbenzene, viz. 328. The chlorine content of the chlorinated m-di-tert-butylbenzene was found to be 41.9 per cent as compared with the theoretical chlorine content of 43.3 per cent for tetrachloro-di-tert-butylbenzene.

A sample of the tetrachloro-m-di-tert-butylbenzene was refluxed for 6½ hours in an excess of 0.5 N aqueous NaOH. Only 2.75% of the chlorine present in the compound was removed by this threatment. This is good evidence that the butyl groups attached to the benzene ring were tertiary butyl and not isobutyl because it is known that chlorine atoms attached to neo-pentyl carbon atoms are very resistant to hydrolysis.

It will be evident from the structure of m-di-tert-butylbenzene that there can be several isomeric beta-tetrachloro-m-di-tert-butylbenzenes. The product that we obtained probably contained at least two of the isomers.

p-Di-tert-butylbenzene was chlorinated by the above technique to yield a product melting at 69.4 to 72.2° C. containing 42.8 per cent of chlorine. Tetrachloro-p-di-tert-butylbenzene on treatment with 100% $H_2SO_4$ decomposed to yield HCl and a variety of other products.

Tetrachloro-m-di-tert-butylbenzene did not decompose with 100% $H_2SO_4$; it was sulfonated with fuming $H_2SO_4$ to yield a sulfonic acid. This acid had a neutral equivalent of 455 (theory=410). The high neutral equivalent is probably due to a trace of oil contaminating the product. The sulfonic acid was converted to the sodium salt which was a solid, which when dissolved in water gave foaming properties to the solution.

The m-di-tert-butylbenzene produced by the process of this invention may be employed as a charging stock for the preparation of a wide variety of chemical derivatives other than exo-halogenated derivatives. Thus, it may be catalytically hydrogenated to a cyclohexane derivative, oxidized, nitrated, sulfonated, halogenated, etc.

Having thus described our invention, what we claim is:

1. A composition of matter consisting essentially of m-di-tert-butylbenzene.

2. A composition of matter consisting essentially of m-di-tert-butylbenzene, having a boiling point of about 106.5° C. under a pressure of 18.2 mm. of mercury and about 78.5° C. under a pressure of 4.4 mm. of mercury.

3. A composition of matter consisting essentially of m-di-tert-butylbenzene having a melting point of about 10.6° C.

4. A composition of matter consisting essentially of m-di-tert-butylbenzene and having a refractive index ($n_D^{20}$) of about 1.4870.

5. A process which comprises alkylating benzene with two molar equivalents of isobutylene in the presence of catalytic quantities of aluminum chloride and hydrogen chloride at a temperature of at least about 130° F. and separating a fraction consisting essentially of m-di-tert-butylbenzene from the reaction products.

6. A process which comprises alkylating benzene with two molar equivalents of isobutylene in the presence of catalytic quantities of aluminum chloride and hydrogen chloride at a temperature between about 130° F. and about 220° F. and separating a fraction consisting essentially of m-di-tert-butylbenzene from the reaction products.

CARL E. JOHNSON.
CHESTER E. ADAMS.

REFERENCES CITED

The following references are of record in the file of this patent:

UNITED STATES PATENTS

| Number | Name | Date |
|---|---|---|
| 2,067,764 | Ipatieff | Jan. 12, 1937 |
| 2,403,757 | Reeves | July 9, 1946 |

OTHER REFERENCES

Simons et al., "Hydrogen Fluoride, II. The Alkylation of Benzene by Olefins," Jour. Amer. Chem. Soc., vol. 60 (Dec. 1938), pages 2952–3 (2 pages).

Shen et al., "Synthesis and Properties, part I. Methods . . ." Jour. Inst. Pet. Tech., vol. 26 (1940), pages 479–480, 481 (3 pages).